United States Patent [19]

Baker et al.

[11] Patent Number: 5,789,508

[45] Date of Patent: Aug. 4, 1998

[54] POLYMERIZATION PROCESS

[75] Inventors: Bruce Edward Baker, Wilmington, Del.; Roger John Zipfel, Washington, W. Va.

[73] Assignee: E. I. du Pont de Nemours and Company, Wilmington, Del.

[21] Appl. No.: 685,085

[22] Filed: Jul. 23, 1996

[51] Int. Cl.$^6$ .................................................. C08F 2/00
[52] U.S. Cl. ........................................ 526/225; 526/247
[58] Field of Search ................................ 526/206, 225, 526/247

[56] References Cited

U.S. PATENT DOCUMENTS

| | | | |
|---|---|---|---|
| 2,856,439 | 10/1958 | Freg | 526/206 |
| 4,025,709 | 5/1977 | Blaise et al. | 526/225 |
| 4,380,618 | 4/1983 | Khan et al. | 526/260 |
| 4,381,384 | 4/1983 | Khan. | |
| 4,384,092 | 5/1983 | Blaise et al. | |

FOREIGN PATENT DOCUMENTS 1067068  5/1967  United Kingdom ................ 526/206

*Primary Examiner*—Joseph L. Schoton
*Assistant Examiner*—N. Sarofim

[57] ABSTRACT

A compound of the formula $C_6F_{12}$—$CH_2CH_2$—$SO_3M$, wherein M is a cation having a valence of 1 is used as a dispersing agent in the aqueous dispersion polymerization of tetrafluoroethylene with at least one other perfluorinated copolymerizable monomer.

5 Claims, No Drawings

POLYMERIZATION PROCESS

RELATED APPLICATIONS

This application claims the benefit of Provisional application Ser. No. 60/003,085 filed Aug. 31, 1995.

FIELD OF THE INVENTION

This invention relates to the aqueous dispersion copolymerization of certain perfluoromonomers.

BACKGROUND OF THE INVENTION

Perfluoroalkyl ethane sulfonic acid and salts thereof, having the formula $F(CF_2—CF_2)_nCH_2—CH_2—SO_3M$, wherein n is a cardinal number of 2 to 8 and M is a cation having a valence of 1, i.e. H, K, has been used as dispersing agent in the aqueous dispersion polymerization of tetrafluoroethylene (TFE) by itself or in combination with other copolymerizable fluorinated ethylenically unsaturated comonomer, as disclosed in U.S. Pat. No. 4,380,618. As disclosed in Example 2 of the patent, the dispersing agent is a mixture wherein the perfluoroalkyl group contains from 4 to 16 carbon atoms, averaging 8 carbon atoms. This surfactant is commercially available as Zonyl® TBS fluorochemical surfactant, and sometimes 8,2-TBS, the number 8 representing the average number of carbon atoms in the mixture of perfluoroalkyl groups and the number 2 representing the ethane carbon atoms. Atochem makes available FORAFAC® 1033 and 1176, which are understood to be the sulfonic acid and potassium salt, respectively, of 6,2-TBS, the number 6 representing perfluorohexyl (n=3 in the above formula) as an emulsifier for the polymerization of fluorinated monomers. U.S. Pat. No. 4,025,709 discloses the use of water soluble salts of perfluoroalkyl ethane sulfonic acid as emulsifier for the aqueous dispersion polymerization of the fluorinated monomer vinylidene fluoride. The perfluoroalkyl group of the emulsifier is disclosed to contains from 4 to 8 carbon atoms. Hexafluoropropylene may be copolymerized with the $VF_2$ to obtain 3 wt % HFP in the resultant copolymer (Examples 6 and 7). The advantage of these emulsifiers over perfluorooctanoate as the emulsifier is disclosed to be greater thermal stability of the $VF_2$ polymer as indicated by less color formation in the polymer when subjected to various thermal treatments. The patent shows reduced color formation when both $C_8F_{17}$— and $C_6F_{13}$— ethanesulfonic acid salts are used as the emulsifier and less improvement when the $NH_4$ salt is used.

The industry standard for the aqueous copolymerization of perfluorocarbon monomers has been the use of perfluoroalkanoate dispersing agents, and in particular wherein the alkyl group averages 8 carbon atoms, which is the perfluorooctanoate tested as the comparison emulsifier in the '709 patent. This dispersing agent, sometimes called perfluorocaprylate and sometimes called C-8, is disclosed in countless publications describing the copolymerization of TFE with other perfluorinated monomers. If any appreciable amount of C-8 is left in the copolymer, it does cause discoloration of the perfluorocarbon copolymer at the high temperatures of its melt fabrication and use, but this problem has been overcome by effective removal of the C-8 from the copolymer prior to melt fabrication or sintering.

It has been discovered however, that C-8 bioaccumulates in animals, thus raising a health question, and making it desirable to replace this industry standard. In particular, it has been found that in a 14-day feeding study involving rodents and standard protocol and 300 ppm of C-8 in the rodents' diet, the amount of fluorine remaining in the rodents' blood seven days after the C-8 diet was stopped was 220 ppm, as compared to 0.56 ppm in rodents which received no C-8 in the diet. It has also been discovered that Zonyl TBS (8,2-TBS) has the problem of bioaccumulation which is indicated by increasing liver weight for rodents being fed a diet which contains this material. In particular, only 3 ppm of the 8,2-TBS in the rodents' diet for 14 days causes a 50% increase in liver weight. C-8 has a similar problem; 4.4 ppm of C-8 in the diet causes a 50% increase in liver weight.

An effective dispersing agent is needed for the copolymerization of perfluorocarbon monomers which does not bioaccumulate.

SUMMARY OF THE INVENTION

The present invention satisfies this need by virtue of the surprising discovery that 6,2-TBS, $C_6F_{13}—CH_2CH_2—SO_3M$, wherein M is a cation having a valence of 1, does not bioaccumulate as indicated by (a) 6,2-TBS being present in the rodents' blood at the level of only 0.45 ppm seven days after 300 ppm of 6,2-TBS was removed from the diet and (b) 6,2-TBS requiring 142 ppm in the rodents' diet before an increase in liver weight of 50% occurs. In contrast to C-8 and 8,2-TBS (mixture of perfluoroalkyl groups containing 4 to 16 carbon atoms, averaging 8 carbon atoms), when only 3–4 ppm of 6,2-TBS is present in the diet, virtually no increase in liver weight occurs.

The present invention may be defined in the context of the process of polymerizing tetrafluoroethylene (TFE) with at least one other perfluorinated copolymerizable monomer in an aqueous medium containing initiator and dispersing agent to obtain a dispersion of particles of melt-fabricable tetrafluoroethylene copolymer, the improvement comprising carrying out the polymerizing wherein the dispersing agent is $C_6F_{13}—CH_2CH_2—SO_3M$, wherein M is a cation having a valence of 1. For simplicity, this dispersing agent can be referred to as 6,2-TBS.

While the present invention is defined in terms of using the 6,2-TBS as the dispersing agent for making melt-fabricable tetrafluoroethylene, the unexpected safety of this particular "cut" of the 8,2-TBS mixture as compared to the 8,2-TBS mixture is part of the invention as a whole.

DETAILED DESCRIPTION OF THE INVENTION

The aqueous dispersion polymerization process of the present invention is conventional except for the use of 6,2-TBS as the dispersing agent for making melt-fabricable TFE copolymer. Organic liquid such as F-113 can be present in the aqueous medium but solvent-free aqueous dispersion polymerization is preferred. The initiator is water-soluble; examples include ammonium persulfate and potassium persulfate, and will generally be used in the amount of 2–500 ppm based on the weight of water present.

6,2-TBS can be prepared from the known process starting with reaction of $R_fI$ with $CH_2=CH_2$ to produce the mixture of compounds available as Zonyl TBS (8,2-TBS). In the reaction to make 8,2-TBS, $R_f$ is a mixture of $C_4$ to $C_{16}$ perfluoroalkyl, averaging 8 carbon atoms. To obtain 6,2-TBS, the reactant $R_fI$ is purified to obtain perfluorohexyl iodide, preferably wherein at least 90% of the perfluoroalkyl groups are perfluorohexyl, which purity is carried over into the eventual 6,2-TBS product. This purification can be carried out by distillation and separation of the 6-carbon atom fraction from the other fractions present, the 4-carbon atom fraction having a boiling point of 67° C., the 6-carbon atom fraction boiling at 118° C., and the 8-carbon atom fraction boiling at 163° C., all at atmospheric pressure. Further information of the synthesis of pefluoroalkyl iodide and distillation and reaction of the iodide to form 6,2-iodide is disclosed in N. S. Rao and R. E. Baker, "Textile Finishes and Fluorosurfactants", *OrganoFluorine Chemistry: Principles and Commercial Applications*, Ed. R. E. Banks et. al. Plenum Press, New York, 1994. The 6,2-TBS can be obtained from perfluorohexyl ethane iodide (6,2-iodide) by well known chemistry, such as disclosed in U.S. Pat. No. 4,784,809.

The amount of 6,2-TBS used as dispersing agent will generally be 0.01–0.20 percent based on the weight of water present. Perfluorohexyl ethane sulfonic acid is preferred over the salt because of the greater solubility of the acid. Alkali metal sulfonates, however, such sodium and potassium, can be used. The ammonium sulfonate can also be used.

The polymerization can be carried out by charging the polymerization reactor with water, surfactant and monomer, agitating the contents of the reactor, and heating the reactor to the desired polymerization temperature, e.g. 50°–110° C., and then adding initiator at the desired rate to start and continue the polymerization. Chain transfer agent may also be added. Tetrafluoroethylene (TFE) is pressured into the reactor at a continuous rate to maintain a pressure of 0.3 to 7 MPa.

An amount of copolymerizable perfluorinated comonomer will also be added to the reactor, usually prior to the start of the polymerization reaction, but may also be added during the reaction if desired. The amount of comonomer added will be effective to incorporate sufficient comonomer into the TFE copolymer to make it melt fabricable, which amount will depend on the reactivity of the comonomer relative to TFE and the amount of incorporation necessary to impart melt-fabricability to the copolymer, this too depending on the particular comonomer used. Generally, the amount of comonomer incorporated into the TFE copolymer will be at least 0.5 mol % and may be as high as 15 mol % and higher, depending on the comonomer. The goal of melt fabricability is demonstratable by the copolymer being processible by one or more melt-processing techniques such as extrusion, injection molding, compression molding and the like. Typically, the TFE copolymer will have a melt viscosity in the range of $10^2$ to $10^6$ Pa.s. Melt viscosity is determined by A.S.T.M. method of D1238-52T, modified as disclosed in U.S. Pat. No. 4,360,618. One skilled in the art will recognize that a variety of perfluorinated monomers other than TFE can be used to achieve melt-fabricable TFE copolymer, and this variety can be used in the process of the present invention. Examples of copolymerizable perfluorinated monomers include perfluoroolefin such as hexafluoropropylene (HFP), or perfluoro(alkyl vinyl ether), commonly called PAVE, wherein the alkyl group contains 1 to 8 carbon atoms, preferably 2 or 3 carbon atoms. More than one comonomer may be incorporated into the TFE copolymer, which for example may be a copolymer of TFE with HFP and PAVE. The polymerization is carried out to achieve the desired polymer solids concentration in the aqueous dispersion, e.g. 20 to 60% based on the weight of water plus solids present, and the polymerization is stopped by stopping the monomer feed and venting the reactor to remove unreacted monomer.

The preferred raw dispersion particle size (RDPS) of the TFE copolymer is 0.15 to 0.35 micrometers. RDPS is measured on the as-polymerized polymer particles by photon correlation spectroscopy and the amount of 6,2-TBS dispersing agent used is preferably that which is effective to produce polymer particle size within this range as well as to disperse the polymer particles. Smaller particles are difficult to coagulate, and larger particles jeopardize dispersion stability.

Instead of the entire amount of the dispersing agent being added to the reactor at the beginning of the polymerization, a portion of the dispersing agent can be added during the polymerization reaction.

Example 1

A horizontally disposed, cylindrical, stainless steel autoclave, having a capacity of 36,250 ml and a length to diameter ratio of about 1.5:1 and provided with a 4-bladed agitator running the length of the autoclave, was charged with 21.8 kg of demineralized water. At a temperature of 65° C., the autoclave was evacuated and purged with TFE three times. After the third evacuation, while the autoclave was still under vacuum, 25 g of perfluorohexyl ethane sulfonic acid dispersion agent dissolved in 1200 ml of demineralized water was charged. With the agitator at 35 rpm, the autoclave was brought to 95° C., pressured with hexafluoropropylene monomer to 28.9 kg/cm² (410 psig), and then pressured with tetrafluoroethylene monomer (3.1 kg) to 42.3 kg/cm² (600 psig), and 2.4 g of ammonium persulfate (APS) initiator dissolved in 300 ml of demineralized water was added at a rate of 25 ml/min. Then a solution of 8 g of potassium persulfate (KPS) initiator dissolved in 1000 ml of demineralized water was added at a rate of 10 ml/min for the remainder of the batch. After kick-off, the pressure was maintained at 42.3 kg/cm² by controlling the tetrafluoroethylene feed rate while maintaining the agitator speed at 35 rpm until the end of the batch. When a total of 9.1 kg of TFE monomer had been added to the autoclave, the feed valve was closed, the agitator was turned off and the autoclave was vented. The total polymerization time was 150 minutes.

The resulting dispersion was discharged from the autoclave and cooled. The dispersion was coagulated with vigorous agitation to obtain a TFE/HFP copolymer fluff which was dried before analyses were carried out. The raw dispersion contained about 31.2% solids and had an average particle size of 0.164 microns. The coagulated polymer had a melt viscosity of $12.4\times10^3$ Pa.s ($12.4\times10^4$ poise), and an HFP content of 10.53 wt %. HFP content is determined on a 0.095–0.105 mm thick film pressed at 300° C., using Fourier transform infrared spectroscopy, as disclosed in U.S. Pat. No. 4,380,618.

What is claimed is:

1. In the process of polymerizing tetrafluoroethylene with at least one other perfluorinated copolymerizable monomer in an aqueous medium containing initiator and dispersing agent to obtain an aqueous dispersion of particles of melt-fabricable tetrafluoroethylene copolymer, the improvement comprising carrying out the polymerization wherein said dispersing agent is a compound of the formula $C_6F_{13}$—$CH_2CH_2$—$SO_3M$, wherein M is a cation having a valence of 1.

2. In the process of claim 1 wherein M is hydrogen.

3. In the process of claim 1 wherein said tetrafluoroethylene copolymer contains at least 0.5 mol % of said comonomer.

4. In the process of claim 3 wherein said comonomer is perfluoroolefin or perfluoro(alkyl vinyl ether) or the combination thereof.

5. In the process of claim 1 wherein said tetrafluoroethylene copolymer contains up to 15 mol % of said comonomer.

* * * * *